May 30, 1967  G. DIRNBERGER  3,322,103
ROTARY PISTON ENGINES

Filed June 11, 1965  4 Sheets-Sheet 1

FIG. 1

INVENTOR.
GEORG DIRNBERGER

May 30, 1967  G. DIRNBERGER  3,322,103
ROTARY PISTON ENGINES
Filed June 11, 1965  4 Sheets-Sheet 2

INVENTOR.
GEORG DIRNBERGER

INVENTOR.
GEORG DIRNBERGER

May 30, 1967  G. DIRNBERGER  3,322,103
ROTARY PISTON ENGINES

Filed June 11, 1965  4 Sheets-Sheet 4

INVENTOR.
GEORG DIRNBERGER

ROTARY PISTON ENGINES
Georg Dirnberger, 8331 Unterrohrbach,
Lower Bavaria, Germany
Filed June 11, 1965, Ser. No. 463,182
Claims priority, application Germany, June 13, 1964,
D 44,687
11 Claims. (Cl. 123—8)

This invention relates to improvements in rotary piston engines, and more specifically to a rotary piston engine operating on the four-cycle principle with spark ignition.

Rotary piston engines comprise two elements rotatable relative to each other, one of these elements being disposed in a corresponding recess in the other one so as to define an interspace, and means for subdividing the interspace between the two elements into at least two chambers the volumes of which continually increase and decrease during the rotation. This increase and decrease in volume of the chambers can be attained by an eccentric rotation, similar to that of a crank drive, of the one element relative to the other in such a manner that in each case at least two surface sections of the one element bear against the corresponding peripheral surface of the other element or in that one of the elements is eccentrically arranged within the other one, sealing means being provided which in accordance with the increasing or decreasing spacing, during rotation, between the outer peripheral surface of the inner element and the inner peripheral surface of the outer element move respectively into, or out of, one of the elements. The first-mentioned arrangement has the disadvantage of the eccentrical running of one of the elements, whereby considerable inertia forces are caused to result especially with the high speeds to be aimed at, whereas in the second arrangement there result considerable difficulties with regard to the tight contact of the sealing means with the peripheral surface along which they move, and to the appreciable wear that is encountered with the high speeds. Such difficulties are particularly grave with a high compression ratio, as is required for a satisfactory efficiency in an internal combustion engine, and thus with an appreciable variation of volume of the individual chambers.

To avoid these difficulties in the second arrangement it is known to use as sealing means a rotor which in a partly cylindrical bore located for the greater part in one of the two counter-rotating elements rotates with a partly cylindrical outer surface about the cylinder axis of this bore and the outer peripheral surface of which is such that in each of its positions of rotation the rotor with its peripheral section projecting from the bore into said interspace is in contact with, or rolls on, the opposite peripheral surface of the other one of the two counter-rotating parts, which surface, according to the chamber volume to be varied, is not circular. In the known rotary piston engines only one such rotor serving as sealing means is provided so that there is available one chamber only. To enable the arrangement to be operated as a four-cycle engine, considerable flywheel masses have to be provided. In another arrangement of this type, a plurality of such rotors are arranged, according to the known layout of multicylinder engines, on a common axle and, according to the angularly staggered arrangement of the crankshaft in known multicylinder engines, so angularly staggered that the flywheel mass can be smaller.

It is an object of the present invention to provide a rotary piston engine which comprises two counter-rotating parts one of which is disposed in a recess in the other one in spaced relationship thereto in such a manner that during rotation the spacing at each point of the one part will vary from a maximum value to sealing engagement of the outer peripheral surface of the inner part with the inner peripheral surface of the outer part, and at least four rotors subdividing the space between the two counter-rotating parts into at least four chambers the volumes of which vary during rotation at least twice from a minimum to a maximum and back again to a minimum so that during one revolution all four working cycles of an internal combustion engine operating on the four-cycle principle can be carried out.

It is another object of the invention to arrange and construct the rotors so that they are positively coupled with the counter-rotating parts in such a manner that in each relative angular position of the two rotating parts they sealingly bear with a section of their surface in their bore against one of the counter-rotating parts, whereas with a generatrix (generating line) of their peripheral section projecting at the inner peripheral surface of said one of the counter-rotating parts at the bore opening to receive said rotors they sealingly bear against the outer peripheral surface of the other one of the counter-rotating parts.

It is a further object of the present invention to provide gear means by means of which the rotors are positively coupled with the counter-rotating parts in such a manner as to occupy a predetermined angular position relative to one another in any relative position of the two counter-rotating parts.

It is a still further object of the present invention to provide in one of the counter-rotating parts feed and exhaust channels in such a manner that behind one of the points at which the minimum volume increases a combustible gas mixture is permitted to stream into the chamber situated at this point and partitioned off by the rotors and that at least the chamber containing the burned gas mixture is brought into communication with the outside of the rotary piston engine shortly before arriving at said point of minimum volume so that the burned gas mixture can stream out, and means for igniting the gas mixture in the chamber of smallest volume are provided, such means being arranged opposite the point of the smallest volume.

It is a further object of the present invention to construct the outer one of the two counter-rotating parts in two parts in such a manner as to completely enclose the inner one of the counter-rotating parts, while defining an interspace between the inner peripheral surface of the outer part and the outer peripheral surface of the inner part, and so as to be separated, with the interposition of sealing means, in a plane extending perpendicularly to the axis of rotation of one of the parts and substantially through the center of both parts, in such a manner that a different thermal expansion of the two counter-rotating parts or of the rotors, respectively, is compensated by a corresponding enlargement or diminution of the partition line of the outer one of the counter-rotating parts.

A still further object of the invention is to design the rotors in such a manner as to achieve a balancing of masses of the eccentrically positioned partly cylindrical rotor bodies, while ensuring, on the other hand, a sealing engagement of the rotors with the end faces in the outer one of the counter-rotating parts and in the bore.

Two different embodiments of the invention will now be described by way of example and with reference to the accompanying drawings, in which.

The rotary piston engine with counterengagement according to the invention may be provided with any number of chambers (at least four), the volumes of which can be varied twice to a minimum and twice to a maximum at a single revolution of the rotatable outer engine part with the aid, on the one hand, of rotors of lenticular cross section rotatable therein and arranged in planetary fashion to be controlled from outside by a stationary sun wheel through the intermediary of planet wheels and, on the other hand, of the outer peripheral surface of the stationary inner engine part of the sealing member so that the four-cycle operation of the hitherto known four-cycle reciprocating piston engines or of the "Wankel engine" can be achieved by rotating parts only, that is, with turbine-like completely vibrationless running and with constantly open feed and exhaust channels in the sealing member, the feed and exhaust channels being opened and closed toward the chambers by the rotors acting as slides. The cross section of the lenticular rotors is defined by two arcs of a circle and the stationary sealing member is defined by two arcs of a circle, four arcs of an ellipse and a section of the envelope curve of a family of circles having centers wandering on an ellipse.

The number of chambers can be augmented at will, whereby a smooth running can be achieved even at slowest speeds of rotation so that a separate disc type flywheel can be dispensed with, which additionally contributes to an increase of speed. The sealing against the stationary parts requires special care only in the zones of the compression and power cycles, whereas it is of lesser importance in the other zones, i.e. about two thirds of the relative range of rotation between the rotatable and stationary parts of the engine.

Figure 1:
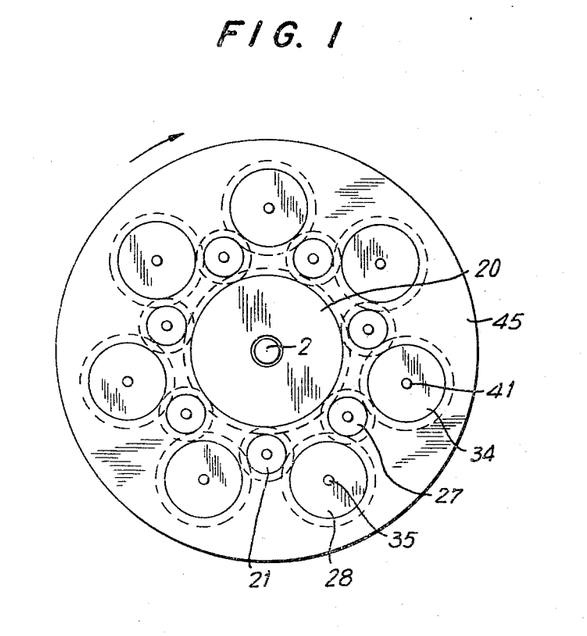
FIG. 1 is a diagrammatic view of a planetary gear system such as can be used for the positive rotary coupling of the rotors with the counter-rotating parts in a rotary piston engine according to the invention, such as shown in FIG. 3.
Figure 2:
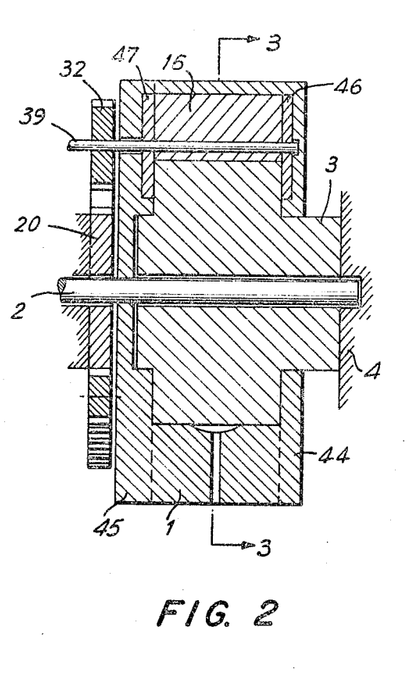
FIG. 2 is a diagrammatic axial section through the rotary piston engine shown in FIG. 3.
Figure 3:
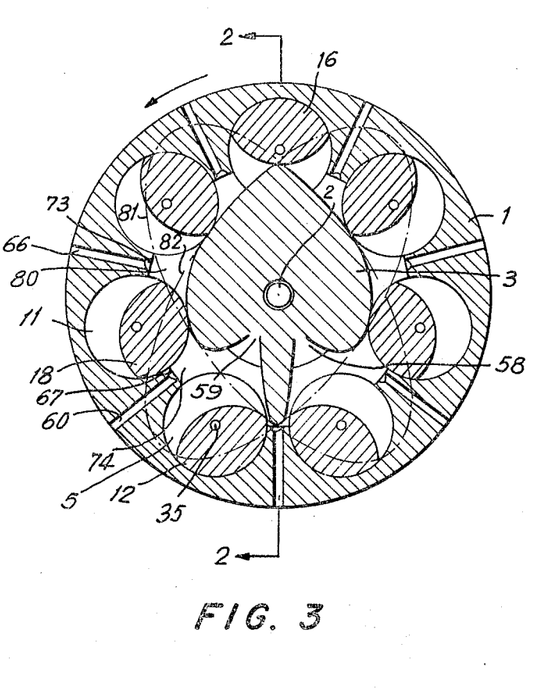
FIG. 3 is a diagrammatic longitudinal section through a rotary piston engine according to the invention.
Figure 4:
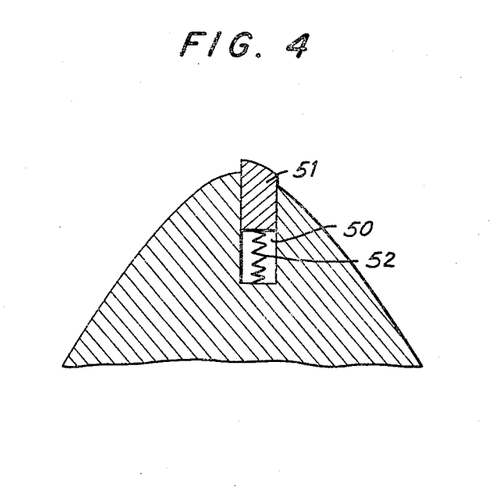
FIG. 4 is a section, on an enlarged scale, through the edge portion of a sealing member, showing a sealing arrangement.
Figure 5:
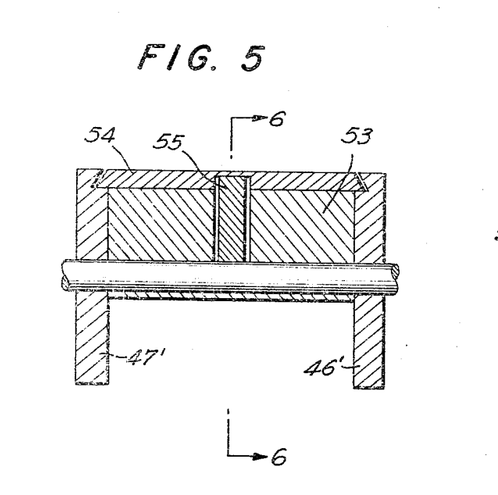
FIG. 5 is a diagrammatic section through a rotor according to the invention, showing a sealing arrangement for sealing the cylindrical rotating part of the rotor against the bore in the outer one of the counter-rotating parts.
Figure 6:
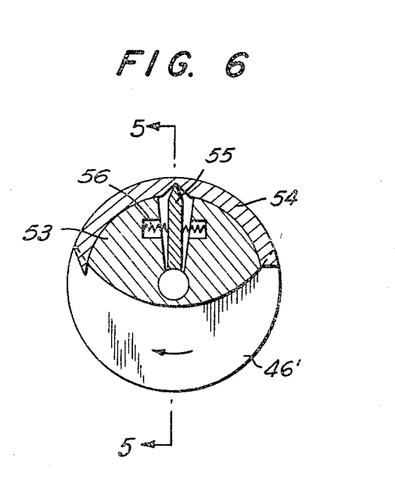
FIG. 6 is an axial section through the rotor illustrated in FIG. 5.

In the following, the first embodiment of the rotary piston engine according to the invention will be described with reference to FIGS. 1 to 6. FIG. 1 shows the control means for the rotors, FIG. 3 is a longitudinal section through the rotary piston engine according to the present invention, FIG. 2 is an axial section through the rotary piston engine of FIG. 3 and FIGS. 4 to 6 show suggestions concerning the sealing. More particularly, FIG. 4 shows the sealing of the part of the sealing member, which projects up to the inner peripheral surface of the outer part of the engine, against the rotatable outer part of the engine and the rotors. This projecting part is hereinafter referred to as the second sealing member projection. FIGS. 5 and 6 show the sealing of the rotor edges (intersection lines of the two lenticular surfaces forming the peripheral surfaces of the rotors) against the outer peripheral surface of the sealing member.

As shown in FIGS. 2 and 3, the rotary piston engine comprises, on the one hand, a rotatable outer engine part consisting of the cylindrical parts designated by reference numerals 1 and 44 and of a part 45 by means of which the whole outer part of the engine is rigidly connected with an output shaft 2 and, on the other hand, of the stationary inner part of the engine consisting of a sealing member 3 which can be secured to one side (the left-hand side in FIG. 2) of the engine block. The cylindrical part 1 is provided with cylindrical bores 5–11 opening toward the inner peripheral surface of the outer part of the engine and having equally spaced axes which are concentric and parallel with the output shaft 2. The bores 5–11 extend over the whole width of the cylindrical part 1. The number of seven bores was chosen at will in the drawings and can be varied upwards at will and downwards to a minimum of four bores. In the bores 5–11 an equal number of rotors 12–18 are provided which are rotatably supported in the outer parts 44 and 45 of the engine. The rotors 12–18 are of a length equal to the width of the outer part 1 of the engine and their peripheral surface is defined by two partly cylindrical surfaces. As shown in FIG. 1, the rotors 12–18 are controlled by a stationary sun wheel 20 through the intermediary of planet wheels 21–27 of any size, which are in meshing engagement with the sun wheel 20. A further set of planet wheels 28–34 is constantly in engagement with the planet wheels 21–27 which are mounted on journals secured to the outside of the outer part 45 of the engine. The number of teeth of each of the planet wheels 28–34 to the number of teeth of the sun wheel 20 are in the ratio of 1:2. The planet wheels 28–34 and the rotors 12–18 are fixed on rotor shafts 35–41 rotatably mounted on the outer parts 44 and 45 of the engine. For example, the rotor 12 is connected for rotation with the planet wheel 28 by means of the shaft 35. The interspace between the inner peripheral surface of the outer part 1 of the engine and the outer peripheral surface of the sealing member 3 is defined by the disc-shaped outer parts 44 and 45 of the engine which are connected for rotation with the outer part 1 of the engine. Part of the engine output is transmitted to the output shaft 2 through the outer part 45 of the engine. The bores 5–11 in the outer part 1 of the engine extend with the same cross section into the outer parts 44 and 45 of the engine, thereby forming disc-shaped recesses in the latter parts which can receive discs rigidly secured to the front ends of the rotors, for example the discs designated in FIG. 2 by reference numerals 46 and 47 for the rotor 16. For supporting the output shaft 2 a bore is provided which extends through a motor block connection piece 4, through the sealing member 3 and through the sun wheel 20.

FIGS. 4 to 6 show examples of the sealing of the rotor edges against the peripheral surface of the sealing member 3, and of the second sealing member projection against the first lenticular surface of the rotors.

Referring to FIG. 4, in the region of the second sealing member projection there is provided a rectangular recess 50 which in its width extends substantially from the plane of symmetry up to a point just in front of the not specifically designated point where the rotor edges clear the periphery of the sealing member. This clearing point is located in front of the relative angular position of the smallest possible working volume, which is occupied by the trailing one of two rotors defining a chamber. The length of the recesses 50 can be chosen as desired in accordance with constructional points of view. Accurately fitted in this recess 50 is a sealing strip 51 which under the pressure exerted by a spring 52 and/or by the centrifugal force of the rotating sealing member 3 can slide along the first lenticular surfaces of the rotors and in close contact with the cylindrical inner peripheral surface of the outer parts of the engine. In its pressed in state, the sealing strip 51 has at its front end the same curved path that appertains, in this place, to the sealing member.

The sealing of the rotor edges against the peripheral surface of the sealing member 3 is illustrated in FIGS. 5 and 6. FIG. 5 shows two discs 46' and 47' connected with a rotor body 53 to form a unit therewith. According to the second embodiment of the present invention, they may also have a diameter smaller than the second lenticular surface of the rotors. Instead of a recess of uniform thickness in the second lenticular surface, a partly cylindrical cup member 54 is applied as sealing element which is anchored in the discs 46' and 47' with the aid of a dove-tailed recess (FIG. 5) so that it is chiefly displaceable only along the second lenticular surface of the rotors. Such displacement is limited, among others, by a lever 55 held in the center position by a spring 56. The cup member 54, moreover, is urged outwardly by the centrifugal force of its revolving rotor, whereby a small gap is caused to result between the cup member 54 and the rotor, which gap is closed by means of transversely extending sealing strips or the like, The cup member 54 may, at the same time, be so designed that due to the centrifugal force resulting thereon it will constantly bear against the wall surface or its bore and be fetched back into its initial position only by the thermal expansion of the contacting metal walls. The theoretically determined rotor edges now are replaced by the edges at both ends of the cup member 54 (FIG. 6). At each end there are two edges between which are located end faces which with respect to their configuration differ again from the shape of the first lenticular surface of their appertaining rotor. This difference is substantially determined by the position of the cup edges I–IV, with the edge I coinciding with the theoretical rotor edge right at the beginning in the direction of rotation, the edge II projecting by about a fraction of a millimeter beyond the theoretical first lenticular surface of the rotor, the edge II again coinciding with the theoretical first lenticular surface of the rotor, and the edge IV, which lies on the circular path of the second lenticular surface of the rotor, projecting also by a fraction of a millimeter beyond the theoretical rotor edge. The appertaining end faces between the cup edges are slightly convex. The displacement of the cup member 54, therefore, is unimportant and takes place only if required and in a mechanical manner. Friction surface conducive to wear are present only in a small number or can be reduced to a minimum. The sealing can be effected successfully.

The operation of an internal combusion engine includes the supply with fresh combustible gas and the exhaust of the burned gases. In the present embodiment, this is effected through a constantly open feed channel 58 and a constantly open exhaust channel 59 shown in FIG. 3. Valves are not necessary, since the channels 58 and 59 are in each case opened or closed on time, with respect to the chambers, by the rotors acting as slides. In the present embodiment, the channels 58 and 59 are formed by slot-shaped recesses in the sealing member 3 (FIG. 3) which open into bent tubes terminating outside the engine block where the other devices can be connected. The angle of the recesses for the feed and exhaust channels is so dimensioned that each chamber communicates with the feed or exhaust channel, respectively, as long as the working volume of the chamber increases or decreases, respectively, during the rotation of the outer part of the engine. Furthermore, the operation of an internal combustion engine includes the ignition. For this purpose, the outer part 1 of the engine is provided with bores 60–66 extending therein radially to the output shaft 2 (FIGS. 2 and 3) and opening into paraboloid recesses 67–73, at the focal point of which the ignition spark is produced by the spark plugs screwed into the bores 60–66 so that from the beginning of the expansion the power of the burning gas mixture can operate with the greatest possible lever arm, provided by the construction, tangentially to the output shaft 2. The recesses 67–73 in the outer part 1 of the engine serve at the same time as overflow channels when upon reaching the highest degree of compression the compressed gas must be pushed beyond the area of the sealing member 3 projecting up to the inner peripheral surface, i.e. beyond the second sealing member projection.

Now when the outer engine part, which consists of the parts 1, 44 and 45, and thus also the rotors 12–18 are rotating in the direction of rotation indicated by arrows in FIG. 3, the rotors are simultaneously rotated at double speed in the opposite direction of rotation about their proper axes through the intermediary of the planetary gear shown in FIG. 1, whereby the working volumes of the chambers 5–11 are periodically increased and decreased.

The peripheral surface of the rotors with lenticular cross section is formed by two partly cylindrical surfaces. One of these surfaces, which is referred to as the first lenticular surface, has an axis extending in the plane of symmetry in parallel spaced relationship to the axis of the bore in which the rotor is arranged for rotation. The other one of these surfaces, which is referred to as the second lenticular surface, coincides with the peripheral surface of the said bore and its axis coincides with the axis of the cylindrical bore. The lenticular cross section of the rotors is defined by two circles, the radius and the center position of the first partial circle (first lenticular surface) being determined by the rating of two constructional quantities, viz. the smallest diameter of the outer part 1 of the engine and the radius of the second partial circle (second lenticular surface).

During the rotation of the outer engine part, each intersection point of the first and second partial circles of each rotor describes an elliptical orbit, whereby intersecting ellipses 81 and 82 are generated which, while being of equal shape and size, have staggered systems of coordinates.

The cross-sectional shape of the cylindrical sealing member 3 is determined by the envelope curve of the cross section of the rotors revolving with the outer engine part. In the region in which the second partial circle of the rotors rolls on the sealing member 3, the cross section of the latter is defined by two diametrically opposed equally large arcs of a circle concentric with the output shaft. In that part of the range of rotation in which the intersection points of the first and second partial circles of the rotor roll on the sealing member 3, the cross section of the latter is defined by sectors of the ellipses 81 and 82. These two ellipses 81 and 82 intersect in two cusps which in turn would determine the shape of the first partial circle of the rotor. But if the circular shape is retained for the first partial circle of the rotor, such cusps as provided by the ellipses 81 and 82 for the cross section of the sealing member 3 are not possible. On the contrary, they must be rounded and the cross section of the sealing member 3 in the immediate proximity of these cusps is given the shape of a section of the envelope curve of a family of circles the centers of which wander along an ellipse.

The four-cycle operation is accomplished as follows: The suction stroke begins when the working volume starts to increase after having reached its minimum, which is the case when the rotors defining the chamber symmetrically to the plane of symmetry of the sealing member 3 are in mirror-inverted relationship to the first sealing member projection in such a manner that with the progression of the rotation the feed channel for the said chamber appears opened, and it terminates when the chamber has reached its largest volume, i.e. when the rotor following the chamber, as seen in the direction of rotation, attains a position relative to the sealing member 3 in which the axis of the output shaft and the axis of the rotor shaft are in the same plane with the longitudinal edge bearing against the sealing member. During the further rotation, there is no variation of the chamber volume until the rotor ahead of the chamber, as seen in the direction of rotation of the outer engine part, reaches a position relative to the sealing member in which the axis of the output shaft 2 and the axis of the rotor shaft are in the same plane with the longitudinal edge bearing against the sealing member 3. In this phase, the sucked in gas mixture is subjected to an adequate turbulence, whereby an increased readiness for ignition and a higher fuel efficiency are attained. Henceforth begins the compression which progresses constantly until the chamber has its smallest volume, which is the case when the rotors defining the chamber are so positioned in mirror-inverted relationship to the plane of symmetry of the sealing member that the second sealing member projection protrudes into the chamber. When the second sealing member projection bearing against the inner periphery of the outer engine part passes through the overflow channel, the compressed gas mixture is pushed over the said projection of the sealing member. Thereafter, the ignition takes place and the power stroke begins. The torque applied to the outer part 1 of the engine rigidly connected with the output shaft 2 acts, from the beginning of the expansion, constantly with the same greatest possible lever arm provided by the construction. Likewise, a torque is applied to the two rotors defining the chamber in which the power stroke takes place. This torque, which acts in the direction of rotation of the outer engine part, is transmitted to the output shaft by the said rotors through the control gears of FIG. 1. Consequently, the rotors are not only shutoff members of the individual chambers and slides for the feed and exhaust channels but also output parts. During the further movement, the chamber volume increases to its maximum to remain constant over a certain angular range of the rotation, whereupon the exhaust of the burned gases is initiated at the beginning of the decrease in volume of the chamber, which continues until the chamber has its minimum volume, to begin then again with the suction stroke. Since the chambers move centrically and symmetrically to the axis of the output shaft, the expansion and the exhaust of the burned gases is effected in the same way as the intake and the compression. A detailed description thus can be dispensed with. At one revolution of the outer part of the engine, consequently, each chamber passes twice through the minimum and the maximum of its volume and thus performs the four described cycles.

Figure 7:
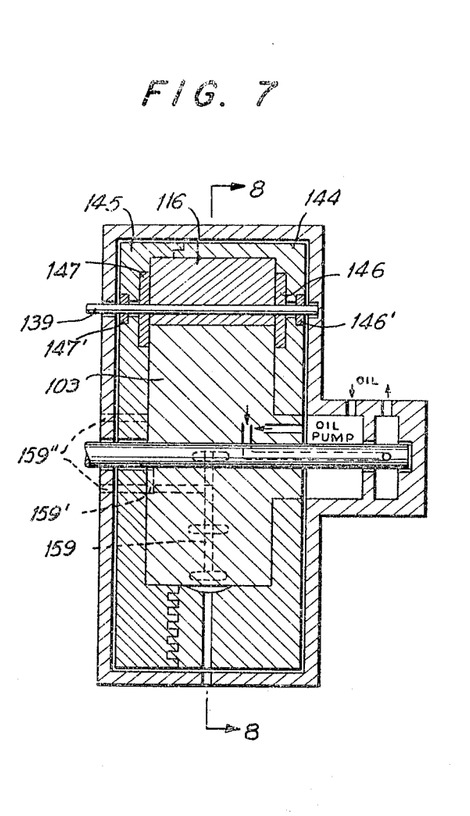
FIG. 7 is an axial section through the rotary piston engine illustrated in FIG. 8, taken on the line 7—7 of FIG. 8, showing particularly the bearing arrangement for the rotors, with driver elements for maintaining a sealing contact of the outer one of the two counter-rotating parts enclosing, as a closed housing, the inner part thereof and the rotors, at different expansion due to heat.
Figure 8:
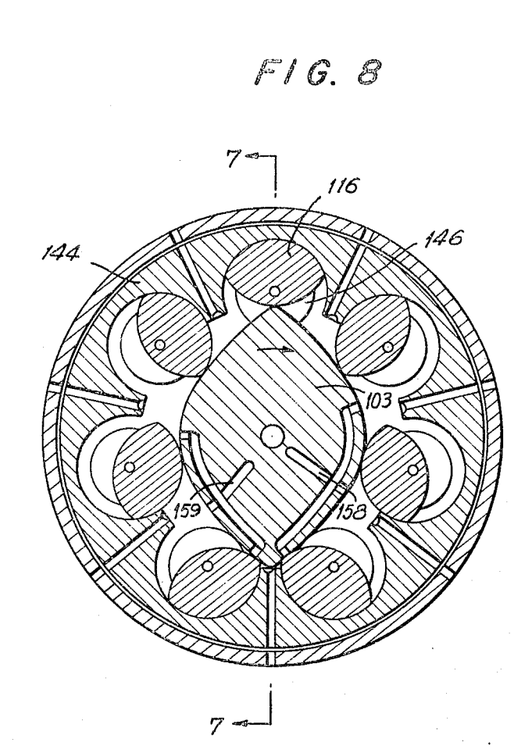
FIG. 8 is a view similar to FIG. 3, showing a section through a modified embodiment of the rotary piston engine; with the feed and exhaust channels being arranged in the inner one of the two counter-rotating parts, which is connected with the drive shaft and arranged for rotation within the stationary outer part.

FIGS. 7 and 8 show a modified embodiment of the rotary piston engine according to the invention, the modification consisting in that the sealing member, which is designated by reference numeral 103, is rotatable, whereas the outer part of the engine consisting of parts 144 and 145 is stationary, whereby the centrifugal load on the rotor shafts is eliminated, which is a decisive advantage. As can be seen from FIGS. 7 and 8, the parts 144 and 145 of the two-part outer part of the engine are connected with each other through a serrated joint in such a manner as to enable the displacement of the two outer parts 144 and 145 of the engine in the direction of the output shaft, whereby thermal expansions of the sealing member 103 and of the rotors can be followed by the outer part of the engine. This is attained by means of discs rigidly connected with the rotor shafts at both ends of the rotors, such as the discs indicated in FIG. 7 by the reference numerals 146 and 147 in connection with a rotor 116, which discs are inserted in corresponding recesses in the outer parts of the engine, as well as by means of discs rigidly mounted on the rotor shafts at a distance from the ends of the rotors, such as the discs designated in FIG. 7 by reference numerals 146′ and 147′ and shown as seated on the shaft of the rotor 116, which rotor shaft is designated by reference numeral 139. This arrangement provides a guide in the shape of an annular groove for the outer parts 144 and 145 of the engine so that these latter can follow the thermal expansions. The discs at the end faces of the rotors, e.g. the discs 146 and 147 for the rotor 116 shown in FIG. 7, have a diameter smaller than the diameter of the cylindrical bores in which the rotors are arranged for rotation, which is to facilitate the sealing.

In the embodiment of FIGS. 7 and 8, furthermore, the feed and exhaust channels are of a different configuration. They consist in each case of three channels which extend in the sealing member 103 and are open toward the interspace between the sealing member 103 and the outer parts of the engine. Within the sealing member 103, these channels are united to form, respectively, a feed channel 158 and an exhaust channel 159 which open into a partly annular feed groove 158′ and into a partly annular exhaust groove 159′, respectively, in the sealing member 103. The grooves 158′ and 159′ communicate respectively with the bores 158″ and 159″ in the outer part 144 and in the casing of the engine. The bores 158″ and 159″ constitute the continuations of the feed and exhaust channels 158 and 159 to the outside. In the embodiment of FIGS. 7 and 8, furthermore, the suction stroke and the exhaust stroke have differently dimensioned angles. The angle of the suction stroke is so chosen that the suction process reaches into the compression zone and the angle of the exhaust stroke is so chosen that the exhaust process initiates shortly before the maximum chamber volume has been attained. In this manner it is achieved that the suction volume is smaller than the exhaust volume, which enables the utilization of the residual pressure which in the known reciprocating piston engines is still present in the lower dead center at the end of the power stroke.

Since the sealing member 103 is rigidly connected with the output shaft, the cooling of the sealing member can be effected in a particularly easy manner, it being possible to feed the oil through the joint between the outer parts 144 and 145 and the casing of the engine for lubricating the surfaces sliding on each other.

The rotary piston engine according to the invention has many essential advantages over the hitherto used rotary piston engines. More particularly, it has the following features and advantages:

All moving parts of the engine are uniformly rotating parts so that smooth running is ensured.

The bearings are not subjected to centrifugal load and the moving parts can be independently balanced.

The four-cycle operation is achieved alone by the configuration of the sealing member and of the rotors without additional control elements.

The constant and greatest possible lever arm at the beginning of, and during, the expansion in all speed ranges permits higher compression and the use of inferior quality fuel.

Subjecting the sucked in mixture to turbulence through circulation during the phase of largest chamber volume between the suction and compression cycles leads to an increased readiness for ignition and increased fuel efficiency. Noxious exhaust gases can be eliminated to a large extent in this manner.

It is possible to attain highest and lowest speeds, and smooth running can be achieved even at lowest speeds by augmenting the number of rotors (highly flexible engine). The favorable relation of the total working space to the total constructional space permits the realization of a compact construction.

The detrimental space can be kept small.

All moving parts, with the exception of the sealing member, are of technologically favorable regular cylinder shape.

The torque applied to the rotors during the expansion cycle is not dissipated but transmited to the engine shaft through the intermediary of the control gears of the rotors.

Different angles of the feed and exhaust channels permit the utilization of the residual pressure existing in the known reciprocating piston engines in the lower dead center.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A rotary piston engine comprising a supporting ring with cylindrical bores opening toward the cylindrical inner wall of said supporting ring, at least four rotors, each of said rotors being mounted for rotation about the central axis of the cylinder coinciding with the wall surface of the bore remaining between the intersection lines of the peripheral surface of said cylinder and the cylindrical inner surface of said supporting ring, a sealing member within said ring and with its outer peripheral surface substantially spaced from the cylindrical inner peripheral surface of said supporting ring; gear means for rotating said rotors at each rotation of said ring relative to said sealing member in a planet wheel fashion about said cylinder axis in such a manner that in each relative angular position between said supporting ring and said sealing member each rotor will be in a predetermined position of rotation, each rotor being part of a cylinder and with a partly cylindrical section of its outer peripheral surface in constantly sealing engagement with the wall of the associated bores in said supporting ring, said sealing member having an outer peripheral surface which in dependence on the rotational position of said rotors caused by said gear means sealingly bears, at least over a substantial portion of the relative range of rotation between said sealing member and said supporting ring, with a generatrix (generating line) against a generatrix of each rotor, the outer peripheral surfaces of said sealing member and of said rotors being so configured that the volume of the chambers partitioned off by the rotors in the interspace between the outer peripheral surfaces of said sealing member and the cylindrical inner surface of said supporting ring periodically increases and decreases, during the relative rotation between said sealing member and said supporting ring, according to the desired compression ratio, temporarily closable passages for feeding a combustible gas mixture into each of said chambers partitioned off by said rotors in the space between said supporting ring and said sealing member, temporarily closable exhaust passages for the combustion gases from said chambers in said supporting ring and/or said sealing member, and means for igniting said combustible gas mixture in a predetermined relative position between said sealing member and the corresponding rotor.

2. A rotary piston engine comprising a supporting ring with cylindrical bores opening toward the cylindrical inner wall of said supporting ring, at least four rotors, each of said rotors being arranged for rotation about the central axis of the cylinder coinciding with the wall surface of the bore remaining between the intersection lines of the peripheral surface of said cylinder and the cylindrical inner surface of said supporting ring, gear means for rotating said rotors at each rotation of said ring relative to said sealing member in planet wheel fashion about said cylinder axis in such a manner that in each relative angular position between said supporting ring and said sealing member each rotor will be in a predetermined position of rotation, the peripheral surface of said sealing member being configured, as developed surface of the peripheral surface of one of said rotors, partly as a cylinder having a diameter smaller than the inner diameter of said supporting ring, diametrically opposite from which the wall surface projects up to the inner peripheral surface of said supporting ring, each rotor having a lenticular cross section symmetrical to its shortest diameter passing through the axis of rotation which is so close to the first lenticular surface that it forms the center of the arc of a circle of the opposite second lenticular surface which coincides with the peripheral surface of the cylinder formed about said axis of rotation and which over its whole length bears against the wall of the bore, whereas when the shortest diameter forming the axis of symmetry coincides with a radial plane passing through said axis of rotation said first lenticular surface contacts said cylindrical inner peripheral surface, temporarily closable passages for feeding a combustible gas mixture into each of said chambers partitioned off by said rotors in the space between said supporting ring and said sealing member, temporarily closable exhaust passages for the combustion gases from said chambers in said supporting ring and/or said sealing member, and means for igniting said combustible gas mixture in a predetermined relative position between said sealing member and the corresponding rotor, either said supporting ring or said sealing member being stationary, whereas the non-stationary one of these two parts is connected with the output shaft.

3. A rotary piston engine comprising a supporting ring with cylindrical bores opening toward the cylindrical inner wall of said supporting ring, at least four rotors, each of said rotors being mounted for rotation about the central axis of the cylinder coinciding with the wall surface of the bore remaining between the intersection lines of the peripheral surface of said cylinder and the cylindrical inner surface of said supporting ring, gear means for rotating said rotors at each rotation of said ring relative to said sealing member in planet wheel fashion about said cylinder axis in such a manner that in each relative angular position between said supporting ring and said sealing member each rotor will be in a predetermined position of rotation, the peripheral surface of said sealing member being configured, as the developed surface of the peripheral surface of one of said rotors, partly as a cylinder having a diameter smaller than the inner diameter of said supporting ring, diametrically opposite from which the wall surface projects up to the inner peripheral surface of the supporting ring, each rotor having a lenticular cross section symmetrical to its shortest diameter passing through the axis of rotation which is so close to the first lenticular surface that it forms the center of the arc of a circle of the opposite second lenticular surface which coincides with the peripheral surface of the cylinder formed about said axis of rotation and which over its whole length bears against the wall of the bore, whereas when the shortest diameter forming the axis of symmetry coincides with a radial plane passing through said axis of rotation said first lenticular surface contacts said cylindrical inner peripheral surface, recesses being provided in the inner peripheral surface of said supporting ring, said recesses forming overflow channels which bridge the zones of said sealing member contacting the inner periphery of said supporting ring when said zones are passing and which permit a rotational compensation on both sides of the line of contact between said supporting ring and said sealing member.

4. A rotary piston engine comprising a supporting ring with cylindrical bores opening toward the cylindrical inner wall of said supporting ring, at least four rotors, each of said rotors being mounted for rotation about the central axis of the cylinder coinciding with the wall surface of the bore remaining between the intersection lines of the peripheral surface of said cylinder and the cylindrical inner surface of said supporting ring, a sealing member within said ring and with its outer peripheral surface substantially spaced from the cylindrical inner peripheral surface of said supporting ring and gear means for rotating said rotors at each rotation of said ring relative to said sealing member in planet wheel fashion about said cylinder axis in such a manner that in each relative angular position between said supporting ring and said sealing member each rotor will be in a predetermined position of rotation, the exhaust passages for the combustion gases being arranged in the sealing member, in the direction of rotation, in front of one of the lines of contact between said sealing member and the inner periphery of said supporting ring and extend over an angular range which is larger than the angular range between the lines of contact of two adjacent ones of said rotors with the outer peripheral surface of said sealing member, whereas the feed passages for a combustible gas mixture are provided, in the direction of rotation, behind said line of contact between said sealing member and said supporting ring and extend over an angular range which is larger than the angular range between the lines of contact of two adjacent ones of said rotors and the outer peripheral surface of said sealing member, either said supporting ring or said sealing member being stationary, whereas the non-stationary one of these two parts is connected with the output shaft.

5. A rotary piston engine as claimed in claim 4, wherein said feed passages and said exhaust passages are defined in said sealing member by sections reentrant from the theoretical line of development of the points of contact between said rotors and said sealing member, said sections communicating with means for preparing the explosive mixture and with the exhaust conduit, respectively.

6. A rotary piston engine as claimed in claim 4, wherein said feed passages and said exhaust passages are provided in the form of bores extending in said sealing member generally parallel to the outer surface and communicating through connecting passages with means for preparing the explosive mixture and with the exhaust conduit, respectively, on the outside of said rotary piston engine, said bores also communicating with the outer peripheral surface of said sealing member through at least two generally radially extending bores.

7. A rotary piston engine comprising a supporting ring with cylindrical bores opening toward the cylindrical inner wall of said supporting ring, at least four rotors, each of said rotors being mounted for rotation about the central axis of the cylinder coinciding with the wall surface of the bore remaining between the intersection lines of the peripheral surface of said cylinder and the cylindrical inner surface of said supporting ring, a sealing member within said ring and with its outer peripheral surface substantially spaced from the cylindrical inner peripheral surface of said supporting ring; gear means for rotating said rotors at each rotation of said ring relative to said sealing member in planet wheel fashion about said cylinder axis in such a manner that in each relative angular position between said supporting ring and said sealing member each rotor will be in a predetermined position of rotation, each rotor being part of a cylinder and with a partly cylindrical section of its outer peripheral surface in constantly sealing engagement with the wall of the associated bores in said supporting ring, said sealing member having an outer peripheral surface which in dependence on the rotational position of said rotors caused by said gear means sealingly bears, at least over a substantial portion of the relative range of rotation between said sealing member and said supporting ring, with a generatrix (generating line) against a generatrix of each rotor, the outer peripheral surfaces of said sealing member and of said rotors being so configured that the volume of the chambers partitioned off by the rotors in the interspace between the outer peripheral surfaces of said sealing member and the cylindrical inner surface of said supporting ring periodically increases and decreases, during the relative rotation between said sealing member and said supporting ring, according to the desired compression ratio, temporarily closable passages for feeding a combustible gas mixture into each of said chambers partitioned off by said rotors in the space between said supporting ring and said sealing member, temporarily closable exhaust passages for the combustion gases from said chambers in said supporting ring and/or said sealing member, and means for igniting said combustible gas mixture in a predetermined relative position between said sealing member and the corresponding rotor, said supporting ring being constructed as a housing which is split in a plane perpendicular to the relative axis of said sealing member and said supporting ring and encloses in its inner space said sealing member and said rotors, with sealing elements being provided in the joint which permit a displacement of the parts of said supporting ring in the direction of said axis of rotation.

8. A rotary piston engine as claimed in claim 7, wherein rotor shafts are provided for rotatably mounting said rotors in said bore and elements supported in both axial directions within said supporting housing are secured to said rotor shafts in such a manner that the two parts of said supporting ring forming a housing are moved toward and away from each other depending on the thermal expansion of said rotor shafts.

9. A rotary piston engine comprising a supporting ring with cylindrical bores opening toward the cylindrical inner wall of said supporting ring, at least four rotors, each of said rotors being mounted for rotation about the central axis of the cylinder coinciding with the wall surface of the bore remaining between the interesection lines of the peripheral surface of said cylinder and the cylindrical inner surface of said supporting ring, a sealing member within said ring and with its outer peripheral surface substantially spaced from the cylindrical inner peripheral surface of said supporting ring; gear means for rotating said rotors at each rotation of said ring relative to said sealing member in planet wheel fashion about said cylinder axis in such a manner that in each relative angular position between said supporting ring and said sealing member each rotor will be in a predetermined position of rotation, temporarily closable passages for feeding a combustible gas mixture into each of said chambers partitioned off by said rotors in the space between said supporting ring and said sealing member, temporarily closable exhaust passages for the combustion gases from said chambers in said supporting ring and/or said sealing member, and means for igniting said combustible gas mixture in a predetermined relative position between said sealing member and the corresponding rotor, the peripheral surface of said sealing member being configurated, as the developed surface of the peripheral surface of one of said rotors, partly as a cylinder having a diameter smaller than the inner diameter of said supporting ring, diametrically opposite from which the wall surface projects up to the inner peripheral surface of said supporting ring, each rotor having a lenticular cross section symmetrical to its shortest diameter passing through the axis of rotation which is so close to the first lenticular surface that it forms the center of the arc of a circle of the opposite second lenticular surface which coincides with the peripheral surface of the cylinder formed about said axis of rotation and which over its whole length bears against the wall of the bore, whereas when the shortest diameter forming the axis of symmetry coincides with a radial plane passing through said axis of rotation said first lenticular surface contacts said cylindrical inner peripheral surface, and discs arranged on the end faces of said rotors and having a circumferential surface concentric with the axis of rotation of the respective rotor, said discs sealingly engaging with their outer end face and with said circumferential surface into corresponding recesses in said supporting ring, either said supporting ring or said sealing member being stationary, whereas the non-stationary one of these two parts is connected with the output shaft.

10. A rotary piston engine comprising a supporting ring with cylindrical bores opening toward the cylindrical inner wall of said supporting ring, at least four rotors, each of said rotors being mounted for rotation about the central axis of the cylinder coinciding with the wall surface of the bore remaining between the intersection lines of the peripheral surface of said cylinder and the cylindrical inner surface of said supporting ring, a sealing member within said ring and with its outer peripheral surface substantially spaced from the cylindrical inner peripheral surface of said supporting ring; gear means for rotating said rotors at each rotation of said ring relative to said sealing member in planet wheel fashion about said cylinder axis in such a manner that in each relative angular position between said supporting ring and said sealing member each rotor will be in a predetermined position of rotation, temporarily closable passages for feeding a combustible gas mixture into each of said chambers partitioned off by said rotors in the space between said supporting ring and said sealing member, temporarily closable exhaust passages for the combustion gases from said chambers in said supporting ring and/or said sealing member, and means for igniting said combustible gas mixture in a predetermined relative position between said sealing member and the corresponding rotor, the peripheral surface of said sealing member being configurated, as the developed surface of the peripheral surface of one of said rotors, partly as a cylinder having a diameter smaller than the inner diameter of said supporting ring, diametrically opposite from which the wall surface projects up to the inner peripheral surface of said supporting ring, each rotor having a lenticular cross section symmetrical to its shortest diameter passing through the axis of rotation which is so close to the first lenticular surface that it forms the center of the arc of a circle of the opposite second lenticular surface which coincides with the peripheral surface of the cylinder formed about said axis of rotation and which over its whole length bears against the wall of the bore, whereas when the shortest diameter forming the axis of symmetry coincides with a radial plane passing through said axis of rotation said first lenticular surface contacts said cylindrical inner peripheral surface, and discs arranged on the end faces of said rotors and having a circumferential surface concentric with the axis of rotation of the respective rotor, said discs sealingly engaging with their outer end face and with said circumferential surface into corresponding recesses in said supporting ring, either said supporting ring or said sealing member being stationary, whereas the non-stationary one of these two parts is connected with the output shaft.

11. A rotary piston engine comprising a supporting ring with cylindrical bores opening toward the cylindrical inner wall of said supporting ring, at least four rotors, each of said rotors being mounted for rotation about the central axis of the cylinder coinciding with the wall surface of the bore remaining between the intersection lines of the peripheral surface of said cylinder and the cylindrical inner surface of said supporting ring, a sealing member within said ring and with its outer peripheral surface substantially spaced from the cylindrical inner peripheral surface of said supporting ring; gear means for rotating said rotors at each rotation of said ring relative to said sealing member in planet wheel fashion about said cylinder axis in such a manner that in each relative angular position between said supporting ring and said sealing member each rotor will be in a predetermined position of rotation, each rotor being part of a cylinder and with a partly cylindrical section of its outer peripheral surface in constantly sealing engagement with the wall of the associated bores in said supporting ring, said sealing member having an outer peripheral surface which in dependence on the rotational position of said rotors caused by said gear means sealingly bears, at least over a substantial portion of the relative range of rotation between said sealing member and said supporting ring, with a generatrix (generating line) against a generatrix of each rotor, the outer peripheral surfaces of said sealing member and of said rotors being so configurated that the volume of the chambers partitioned off by the rotors in the interspace between the outer peripheral surfaces of said sealing member and the cylindrical inner surface of said supporting ring periodically increases and decreases, during the relative rotation between said sealing member and said supporting ring, according to the desired compression ratio, the exhaust passages for the combustion gases being arranged in the sealing member, in the direction of rotation, in front of one of the lines of contact between said sealing member and the inner periphery of said supporting ring and extend over an angular range which is larger than the angular range between the lines of contact of two adjacent ones of said rotors with the outer peripheral surface of said sealing member, whereas the feed passages for a combustible gas mixture are provided, in the direction of rotation, behind said line of contact between said sealing member and said supporting ring and extend over an angular range which is larger than the angular range between the lines of contact of two adjacent ones of said rotors and the outer peripheral surface of said sealing member, said supporting ring being constructed as a housing which is split in a plane perpendicular to the relative axis of said sealing member and said supporting ring and encloses in its inner space said sealing member and said rotors, with sealing elements being provided in the joint which permit a displacement of the parts of said supporting ring in the direction of said axis of rotation, discs arranged on the end faces of said rotors and having a circumferential surface concentric with the axis of rotation of the respective rotor, said discs sealingly engaging with their outer end face and with said circumferential surface into corresponding recesses in said supporting ring, the cylinder surface of the rotor concentric with said axis of rotation being covered by a radially displaceable and circumferentially and axially fixed sealing plate urged against the wall of the bore or, at a suitable rotational position of the rotor, against said wall of the bore and against the outer peripheral surface of said sealing member by centrifugal force, and sealing means preventing gas from streaming in the peripheral direction through the gap between said rotor and said sealing plate, either said supporting ring or said sealing member being stationary, whereas the non-stationary one of these two parts is connected with the output shaft.

References Cited
UNITED STATES PATENTS

| | | | |
|---|---|---|---|
| 473,940 | 5/1892 | Mason | 103—143 |
| 994,311 | 6/1911 | Green | 230—150 |
| 1,818,097 | 8/1931 | Petrelli | 103—121 |
| 1,953,695 | 4/1934 | Walter | 230—150 |
| 2,110,554 | 3/1938 | Metzler | 91—67 |
| 2,136,066 | 11/1938 | Walters et al. | 123—8 |
| 2,182,719 | 12/1939 | Booth | 103—143 |
| 2,198,130 | 4/1940 | Schweiger | 123—13 |
| 2,362,705 | 11/1944 | Macartney et al. | 123—13 |
| 2,905,095 | 9/1959 | Hartmann et al. | 103—125 |

DONLEY J. STOCKING, *Primary Examiner.*

W. J. GOODLIN, *Assistant Examiner.*